July 17, 1928.  
W. S. GRAHAM  
TRACTOR LISTER  
Filed Feb. 6, 1924  
1,677,474  
2 Sheets-Sheet 2
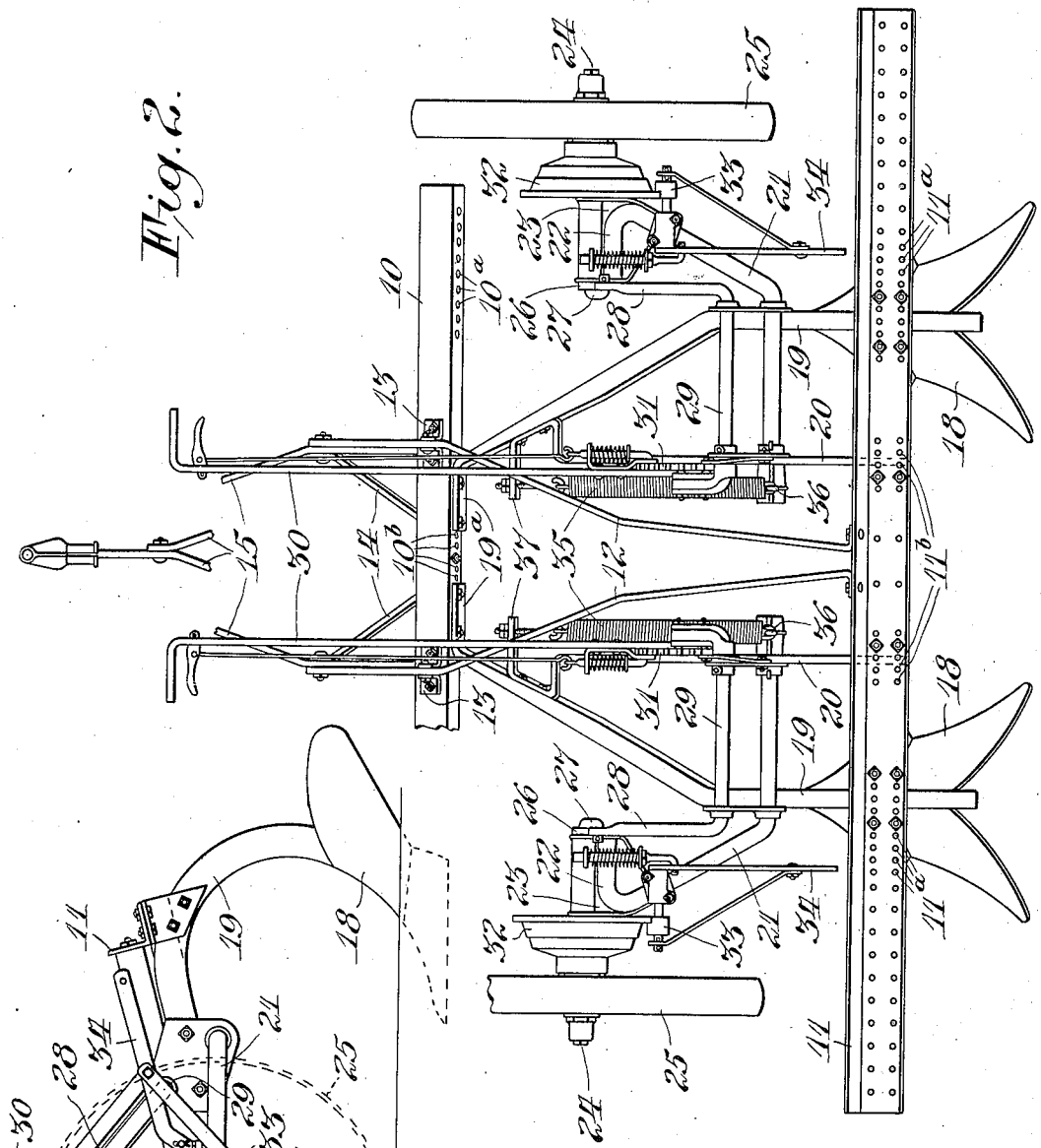
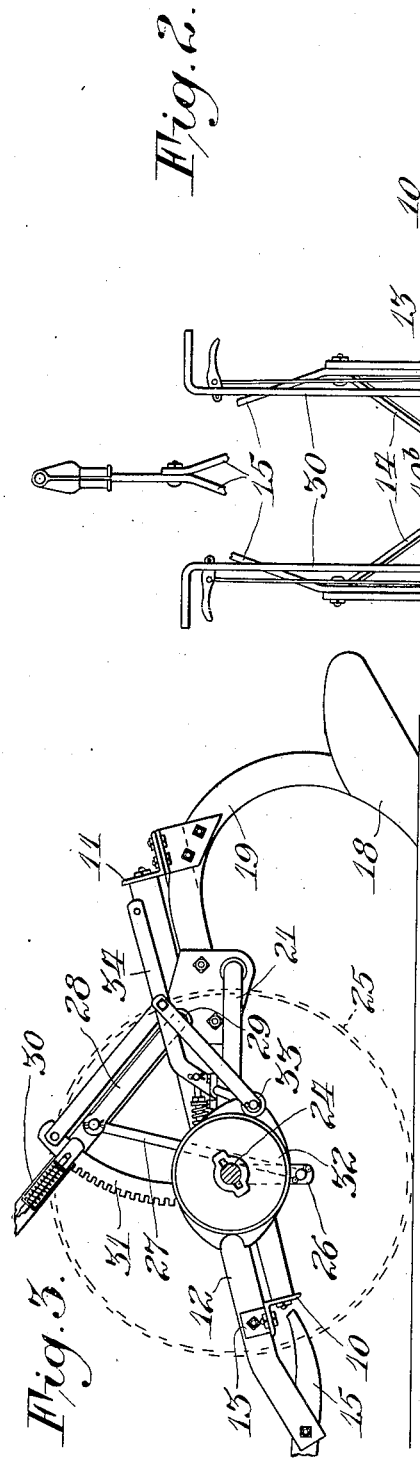
Inventor.  
William S. Graham,  
By H. C. Doolittle  
Atty.

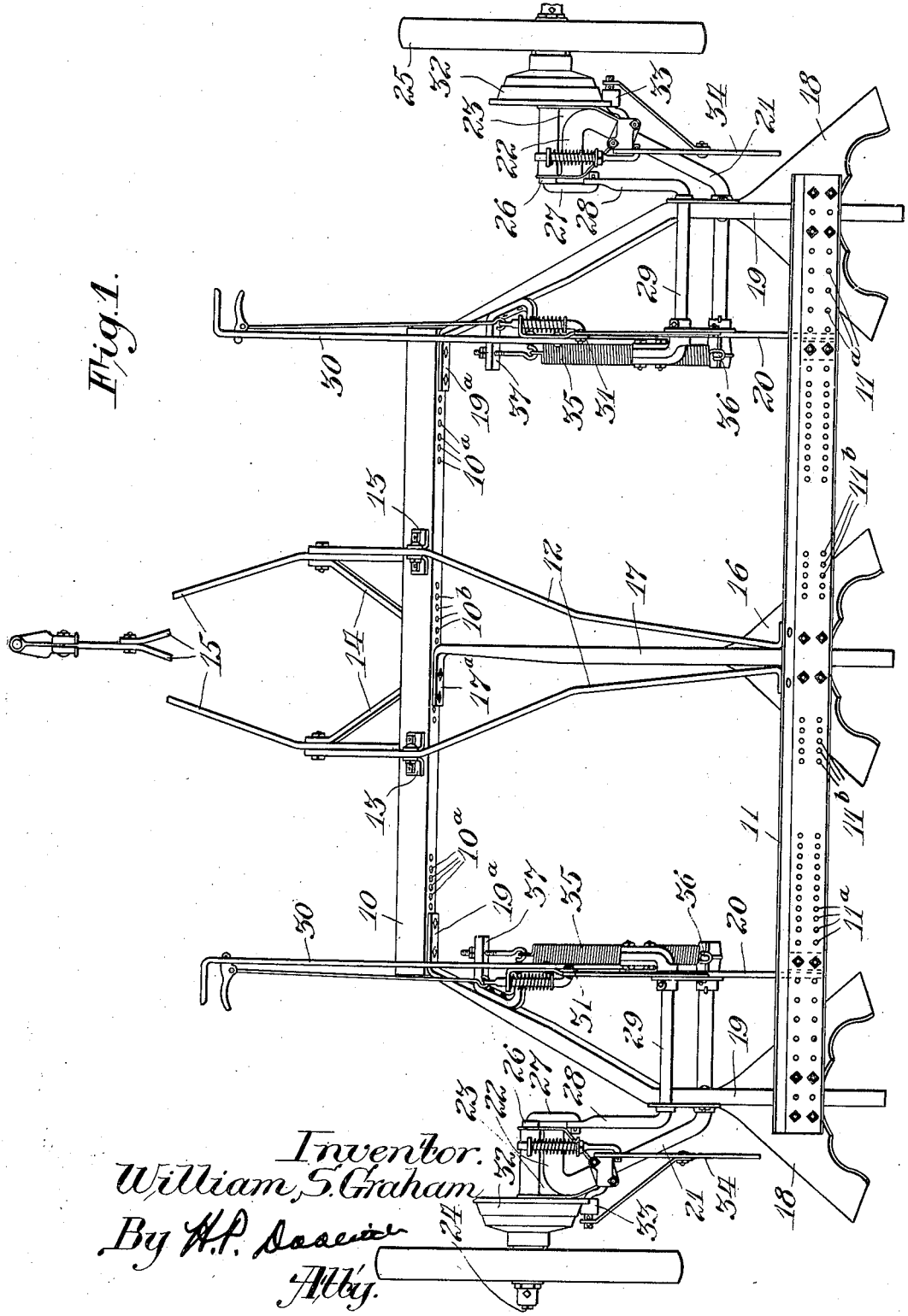

Patented July 17, 1928.

1,677,474

UNITED STATES PATENT OFFICE.

WILLIAM S. GRAHAM, OF CANTON, ILLINOIS, ASSIGNOR TO INTERNATIONAL HARVESTER COMPANY, OF CHICAGO, ILLINOIS, A CORPORATION OF NEW JERSEY.

TRACTOR LISTER.

Application filed February 6, 1924. Serial No. 690,898.

This invention is directed to improvements in the construction of lister plows of the type used in breaking ground for wheat, and the main object of the invention is to provide an implement of simple construction that can be converted from a two-row to a three-row machine and vice versa and that will be adjustable to various widths when used as either a two or three-row implement.

In lister plowing with tractor power, the average small tractor is only capable of handling a two-row machine when throwing up the ridges in the first instance, but when relisting or brusting out the ridges previously thrown up by the two-plow machine, as practised in the wheat land country, three plow bottoms should be pulled as it is evident that the tractor, when working on land previously listed, must necessarily run with its wheels in the furrows and must pull an odd number of plows or sweeps in order to properly engage the ridges. By substitution of special sweeps, three bottoms can be handled by the tractor when relisting, and, in view of the foregoing facts, the advantages residing in a convertible machine of the type herein disclosed become plainly apparent.

The above and other objects have accordingly been attained by the preferred embodiment of the invention hereinafter disclosed and claimed.

Referring to the drawings accompanying the application,—

Fig. 1 is a plan view of a machine embodying the invention, showing the three-plow arrangement and the special sweeps then employed;

Fig. 2 is a similar view showing the two-plow arrangement employing lister bottoms; and Fig. 3 is a side elevation.

A machine constructed in accordance with the principles of this invention comprises a front, transversely extending, frame bar 10 and a similar parallel rear bar 11 connected centrally by a pair of longitudinally extending bars 12. The rear bar 11 extends beyond the front bar 10 at each side of the machine for a purpose to be described, and the respective bars are preferably of angle iron and set in reversed position; that is, the front bar 10 is placed with its rear flange depending vertically, and the rear bar 11, with its forward flange extending upwardly. The vertical flange of bar 10 is provided with a series of perforations 10ª at either end of its vertical flange and with a third series 10ᵇ at its center. Corresponding perforations are provided at 11ª and 11ᵇ in the horizontal flange of the rear bar 11. The central members 12 of the frame are secured at the rear to the vertical flange of bar 11 and pass over bar 10 to which they are fastened by means of brackets 13. The forward ends of bars 12 are spaced apart and braced on the bar 10 by braces 14, and the bolts securing these braces to the ends of bars 12 serve also as pivotal supports for a draft frame 15, the forward end of which is provided with the usual means for coupling to a tractor. The rear ends of the bars constituting the draft frame 15 extend just beneath the front bar 10 as shown in Fig. 3. The effect of this arrangement is that the draft frame is free to pivot when the machine is in operation, but will engage beneath bar 10 when the frame is raised, thereby preventing backward tilting of the machine.

For combination with the frame construction above described there is provided a pair of similar outer plowing units and one central unit. The central unit consists of a sweep 16 carried on an ordinary plow beam 17 secured at its rear end to the bar 11 and having the forward end of its beam bent laterally as at 17ª and secured to the front bar 10 by bolts in certain of the perforations 10ᵇ. The outer units are similar in construction and, therefore, only one of them will be described. Each comprises a plow bottom 18 which is preferably a sweep, as shown in Fig. 1, when a three-bottom arrangement is in use, and a lister bottom, as shown in Fig. 2, when used as a two-bottom arrangement. The bottom 18 is carried on a beam 19, the rear portion of which is straight and the forward portion bent inwardly toward the center of the machine in a manner to offset the forward end of the beam, as at 19ª. The straight rear portion of the beam 19 is selectively attachable in the perforations 11ª of bar 11 and the forward offset end 19ª thereof is similarly attachable in the perforations 10ª of bar 10. A supplemental bar 20 connects the inwardly inclined portion of beam 19 with bar 11 and serves to strengthen the unit and brace the machine. On the rear portion of beam 19 and bar 20 there is journaled the horizontal portion of a forwardly inclined crank axle 21. The forward end of this axle is bent inwardly as at 22 and has secured to it a bearing bracket 23 in which there is journaled a wheel shaft 24 carrying the supporting wheel 25. The inner end of wheel shaft 24 is bent to form a crank 26 and the end of this crank is pivoted to a lifting link 27 (Fig. 3), the upper end of which is pivoted to a crank arm 28 on transverse shaft 29 also journaled on the unit. A forwardly extending lever 30 is secured to the inner end of shaft 29 and has the usual latch mechanism cooperating with a toothed quadrant 31 secured on bar 20. By this arrangement lever 30 serves to adjust the supporting wheel for depth of plowing and may be used to lift and lower the plows to and from the ground, but, for this latter purpose, there is preferably provided power lift mechanism comprising the usual two-part intermittent clutch 32 carried on wheel 25 and axle 24 and controlled by trip 33 through actuation of trip lever 34 in the manner well understood by those skilled in the art, the mechanism here employed being similar in all essential respects to that disclosed in the patent to Lindgren #1,440,924, January 2, 1923, and, therefore, not described in further detail here. In order to assist the lift, the tension spring 35 connects an arm 36 on the inner end of the crank axle 21 with an abutment 37 preferably formed by extension of the forward end of bar 20 inwardly from its point of attachment to the forward end of beam 19, as clearly shown in Figs. 1 and 2.

It is to be noticed that each unit is self-contained, the axle and wheel and adjusting mechanism therefor being carried on the beam and supplemental bar and all being adjustable laterally together on bars 10 and 11. When in position the pair of beams comprised in the outer units converge inwardly, and this in connection with the long rear bar and shorter front bar makes the machine convertible, as there will be no interference with the wheels by the front bar when the units are set in for two rows as in Fig. 2. When it is desired to convert the machine from a three-row to a two-row machine, the central unit 17 is detached and the outer units moved inwardly to the position shown in Fig. 2, the relative arrangement of the various series of perforations in the respective bars being such that the outer units may be selectively positioned at the desired spacing whether two or three bottoms are used, and the construction of the frame being such that the units can be positioned at any desired adjustment without interference from any of the frame members, the machine being in either case rigid when assembled and the control levers easily accessible to the driver of the tractor.

The above construction exemplifies a simple and preferred embodiment of the invention, but it will be understood that modifications thereof may be made within the scope of the appended claims.

What is claimed as new is:

1. A convertible lister comprising the combination of front and rear transversely extending frame bars with the rear bar extending beyond the front bar at each side, a centrally located plow carrying beam removably secured to the bars, and a plow carrying unit mounted between the respective outer portions of said bars and adjustable to selective positions towards and from the middle thereof, each unit comprising a supporting wheel carried on a forwardly inclined crank axle adjustably journaled on the unit and located on the outer side of said beam and towards the forward end thereof.

2. A convertible lister comprising the combination of front and rear transversely extending frame bars with the rear bar extended beyond the front bar at each side, rigid members connecting the central portions of the bars, and a pair of plowing units adjustable transversely on the bars, each unit comprising a plow carrying beam connected to the respective bars at its front and rear ends, said beams converging inwardly, and each unit comprising a supporting wheel carried on a forwardly inclined crank axle adjustably journaled on the unit and located on the outer side of said beam and towards the forward end thereof.

3. A convertible lister comprising the combination of front and rear transversely extending frame bars with the rear bar extended beyond the front bar at each side, and a pair of plowing units mounted on said bars for transverse adjustment, each unit comprising a plow carrying beam connected to the respective frame bars at its front and rear ends, its forward end being offset inwardly, and a supporting wheel mounted on each unit and located towards the forward end of the plow beam.

4. A convertible lister comprising the combination of a short front transversely extending frame bar, a long frame bar parallel to and spaced rearwardly of the front bar, a centrally located plow carrying member removably secured to the bars, and plow carrying members having inwardly bent forward ends mounted between the respective outer portions of said bars and adjustable to selective positions towards the middle thereof to make a two-row lister when the central plow carrying member is removed.

5. A convertible lister comprising the combination of front and rear transversely extending frame bars of unequal lengths, the front bar being the shorter, and a plurality of plowing units mounted on said bars for transverse adjustment, each unit comprising a supporting wheel and a plow carrying beam, each beam being secured to the respective frame bars at its front and rear ends and the beams of the outer units being bent inwardly at their front ends.

6. A lister plow including frame members, a plurality of self contained lister plow units carried by the frame members, said units being connected to the frame members by transversely bent plow beams so as to render the plow readily convertible from a three row lister to a two row lister by removing the middle unit and moving the side units inwardly without changing the frame members.

7. A lister plow readily convertible from a three row lister to a two row lister, said plow including a plurality of self contained lister plow units, each of said self contained units having a transversely bent plow beam and a lift mechanism incorporated therewith.

8. A lister so constructed as to be readily convertible from a three-row lister to a two row lister comprising, in combination, a front transverse frame bar, a rear frame bar parallel to the front bar and extending beyond the ends of the front bar at both sides of the lister, and wheeled lister plow units connecting the ends of the frame bars when the lister is used as a three-row machine, the units having inwardly bent plow beams constituting the main frame connections between the frame bars.

9. A lister so constructed as to be readily convertible from a three-row machine to a two-row machine comprising, in combination, a front transversely extending frame bar, a rear frame bar parallel to the front bar and extending laterally beyond the front bar at each side of the machine, a plurality of plowing units rigidly connecting said frame bars, each of said units including a plow carrying beam rigidly connecting the frame bars, the outer plowing units having their plow beams bent inwardly of the lister so that these beams converge forwardly of the lister, and wheel supports for the outer plowing units.

10. A lister readily convertible from a three-row machine to a two-row machine comprising, in combination, a front transversely extending frame bar, a rear transversely extending frame bar extending beyond the ends of the front bar at each side of the lister, and a lister plow carrying unit connecting the respective outer portions of said bars and adjustable to selective positions toward and from the longitudinal median line of the machine, each unit comprising a plow beam rigidly connected to the frame bars and constituting the only means of connecting the frame bars at the positions of the units, the plow beams being bent inwardly so that the rear ends of the beams may be secured to the ends of the rear frame bar and their front ends secured to the ends of the front frame bar.

In testimony whereof I affix my signature.

WILLIAM S. GRAHAM.